US009977426B2

(12) United States Patent
Chen et al.

(10) Patent No.: US 9,977,426 B2
(45) Date of Patent: May 22, 2018

(54) MOBILE DEVICE, CONTROLLING TERMINAL, MOBILE DEVICE CONTROLLING SYSTEM AND METHOD

(71) Applicant: CLOUD NETWORK TECHNOLOGY SINGAPORE PTE. LTD., Singapore (SG)

(72) Inventors: Wei-Chun Chen, New Taipei (TW); You-Yun Lee, New Taipei (TW); Chin-Chieh Tseng, New Taipei (TW); Kai-Fan Lee, New Taipei (TW); Chi-Ming Huang, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 0 days. days.

(21) Appl. No.: 15/252,238

(22) Filed: Aug. 31, 2016

(65) Prior Publication Data

US 2018/0017963 A1 Jan. 18, 2018

(30) Foreign Application Priority Data

Jul. 12, 2016 (CN) .......................... 2016 1 0544520

(51) Int. Cl.
*G05D 1/00* (2006.01)
*H04W 76/02* (2009.01)
(Continued)

(52) U.S. Cl.
CPC ......... *G05D 1/0022* (2013.01); *G05D 1/0016* (2013.01); *G05D 1/0027* (2013.01); *H04L 67/12* (2013.01); *H04L 67/42* (2013.01); *H04W 8/26* (2013.01); *H04W 12/06* (2013.01); *H04W 76/02* (2013.01); *H04W 76/10* (2018.02)

(58) Field of Classification Search
CPC .. G05D 1/0022; G05D 1/0016; G05D 1/0027; H04L 67/12; H04L 67/42; H04W 8/26; H04W 12/06; H04W 76/02
See application file for complete search history.

(56) References Cited

U.S. PATENT DOCUMENTS 7,474,984 B2 * 1/2009 Freifeld .............. A63H 18/005 340/573.1
7,484,008 B1 * 1/2009 Gelvin ................... H04L 67/12 701/408
(Continued)

OTHER PUBLICATIONS

IEEE 100 The Authoritative Dictionary of IEEE Standards Terms Seventh Edition, 2000, all pages.*

*Primary Examiner* — Calvin Cheung
(74) *Attorney, Agent, or Firm* — ScienBiziP, P.C.

(57) ABSTRACT

A mobile device controlling system includes one mobile device of a plurality, a controlling terminal of a plurality, and a server. A method for the system is also described. The one mobile device of the plurality includes a connection establishment module, an information transmission module, and an operation module. The connection establishment module transmits on startup a connection request to a server to establish a connection and the information transmission module transmits mobile device ID and status to the server. The operation module receives feedback from the server as to one verified controlling terminal within the plurality and the mobile device can be exclusively controlled by that terminal according to the feedback.

12 Claims, 5 Drawing Sheets

(51) Int. Cl.
*H04W 12/06* (2009.01)
*H04L 29/06* (2006.01)
*H04L 29/08* (2006.01)
*H04W 8/26* (2009.01)

(56) References Cited

U.S. PATENT DOCUMENTS 7,991,492 B1 * 8/2011 Namanny .............. A63H 18/00 463/16
8,458,462 B1 * 6/2013 Hanna ..................... H04L 63/10 713/156
9,036,509 B1 * 5/2015 Addepalli ............. H04W 4/046 370/259
9,488,979 B1 * 11/2016 Chambers ............ G05D 1/0088
2003/0103482 A1 * 6/2003 Van Bosch ............. H04L 29/06 370/338
2004/0019413 A1 * 1/2004 Bonilla .............. B60G 17/0195 701/2
2005/0065678 A1 * 3/2005 Smith .................... G06Q 10/00 701/31.4
2005/0065779 A1 * 3/2005 Odinak ................... G10L 15/30 704/201
2005/0154500 A1 * 7/2005 Sonnenrein ............ G07C 5/008 701/1
2006/0012118 A1 * 1/2006 Mamitsu ................. A63F 13/08 273/148 B
2006/0095174 A1 * 5/2006 Sonnenrein ............. B60R 16/02 701/31.5
2006/0235580 A1 * 10/2006 Weiss ...................... B60R 16/02 701/2
2008/0108406 A1 * 5/2008 Oberberger ............. G07F 17/32 463/16
2009/0053974 A1 * 2/2009 Domm ................... A63H 18/00 446/454
2010/0114633 A1 * 5/2010 Sislak .................. G06Q 10/047 701/120
2010/0274690 A1 * 10/2010 Tate, Jr. .............. B60L 11/1824 705/30
2012/0066301 A1 * 3/2012 Holland ................. G06Q 50/01 709/204
2012/0226421 A1 * 9/2012 Kote ....................... B60R 25/20 701/51
2013/0198802 A1 * 8/2013 Ricci ....................... H04L 63/10 726/1
2013/0268998 A1 * 10/2013 Ko ........................ H04W 12/06 726/3
2014/0277916 A1 * 9/2014 Mullen .................. G06Q 40/08 701/31.4
2015/0153175 A1 * 6/2015 Skaaksrud ............ H04W 12/06 701/23
2015/0185034 A1 * 7/2015 Abhyanker ............ G01C 21/36 701/23
2015/0254986 A1 * 9/2015 Fairfield .................. G08G 1/22 707/687
2015/0321641 A1 * 11/2015 Abou Mahmoud ........... B60R 25/2018 701/2
2016/0050213 A1 * 2/2016 Storr ....................... G06F 21/32 726/6
2016/0070527 A1 * 3/2016 Ricci ....................... G06F 3/165 715/716
2016/0140851 A1 * 5/2016 Levy .................... G08G 5/0069 701/3
2016/0266579 A1 * 9/2016 Chen .................... G05D 1/0038
2016/0376031 A1 * 12/2016 Michalski ................. B64F 1/36 701/15
2017/0045894 A1 * 2/2017 Canoy .................... G05D 1/101
2017/0092109 A1 * 3/2017 Trundle .............. B60L 11/1824
2017/0192437 A1 * 7/2017 Bier ..................... G05D 1/0038
2017/0337826 A1 * 11/2017 Moran .................. B64C 39/024

* cited by examiner

MOBILE DEVICE, CONTROLLING TERMINAL, MOBILE DEVICE CONTROLLING SYSTEM AND METHOD

FIELD

The subject matter herein generally relates to a mobile device, a controlling terminal, a mobile device controlling system and method.

BACKGROUND

At the present time, unmanned vehicle control system has many limitations. For example, some unmanned vehicle control systems typically allow only one-to-one control of a single unmanned vehicle, and the controller must be in the same local network as vehicle. Whenever users change their locations, the network addresses of control side need to be reset before they can make or continue connection.

BRIEF DESCRIPTION OF THE DRAWINGS

Implementations of the present technology will now be described, by way of example only, with reference to the attached figures.

DETAILED DESCRIPTION

Figure 1:
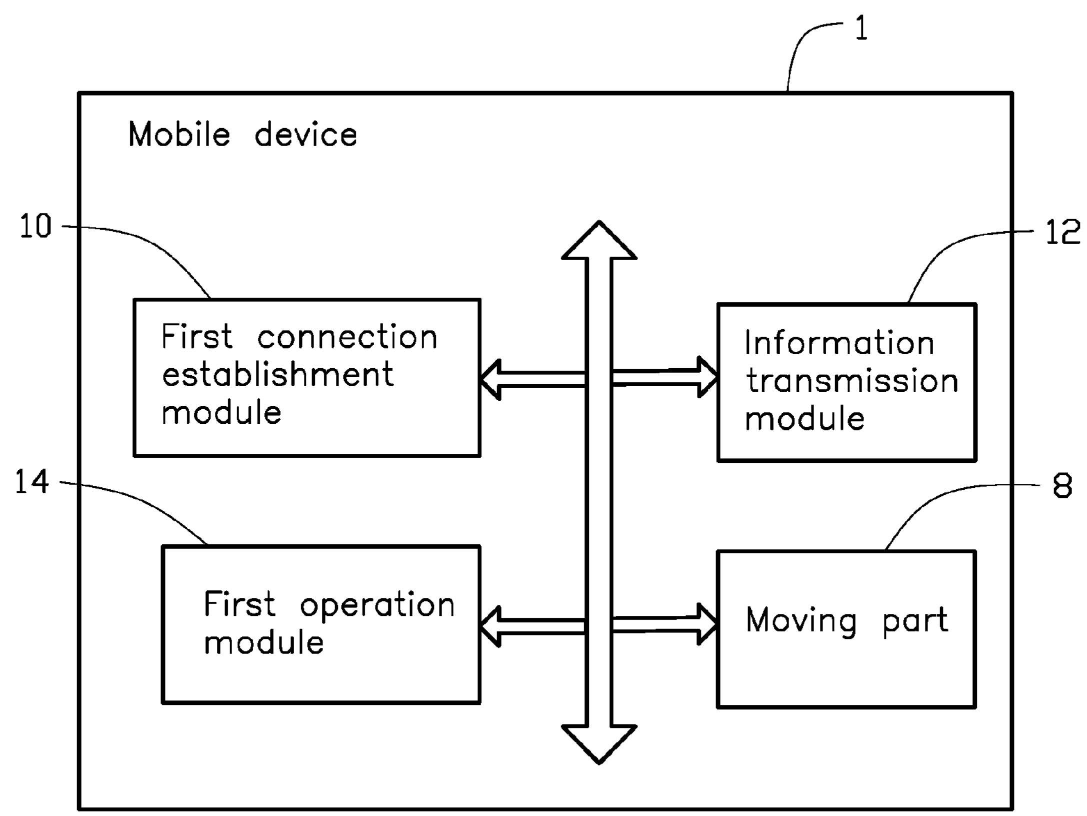
FIG. 1 is a block diagram of an embodiment of a mobile device of the present disclosure.
Figure 2:
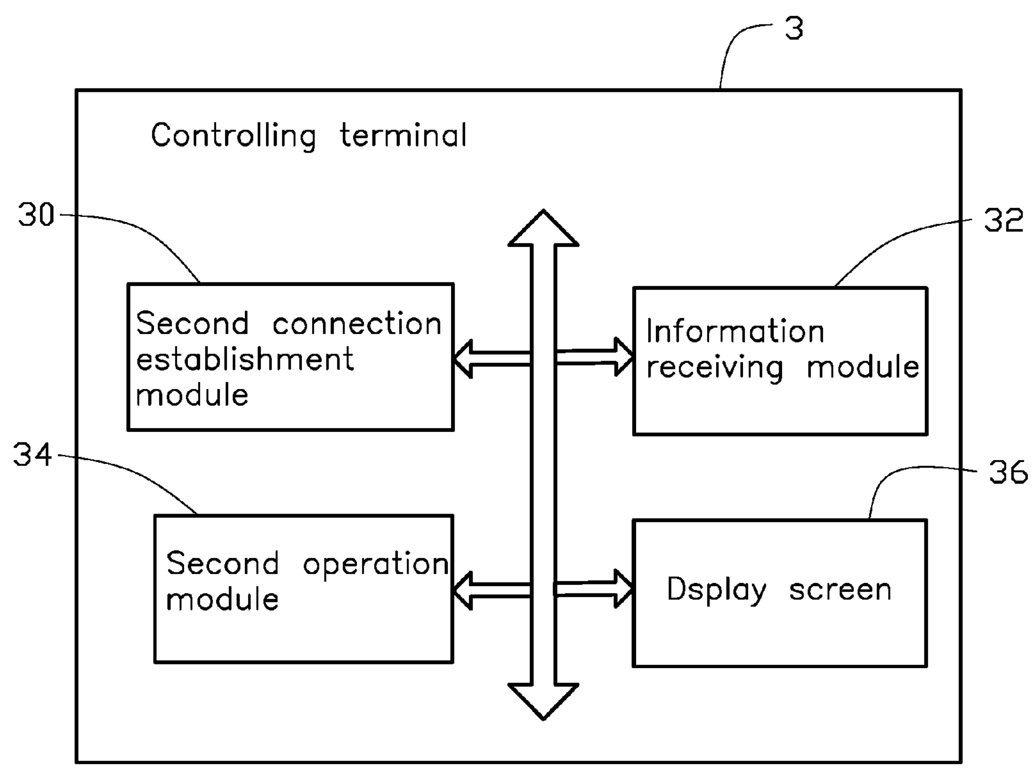
FIG. 2 is a block diagram of an embodiment of a controlling terminal which can be applied to the mobile device of FIG. 1.
Figure 3:
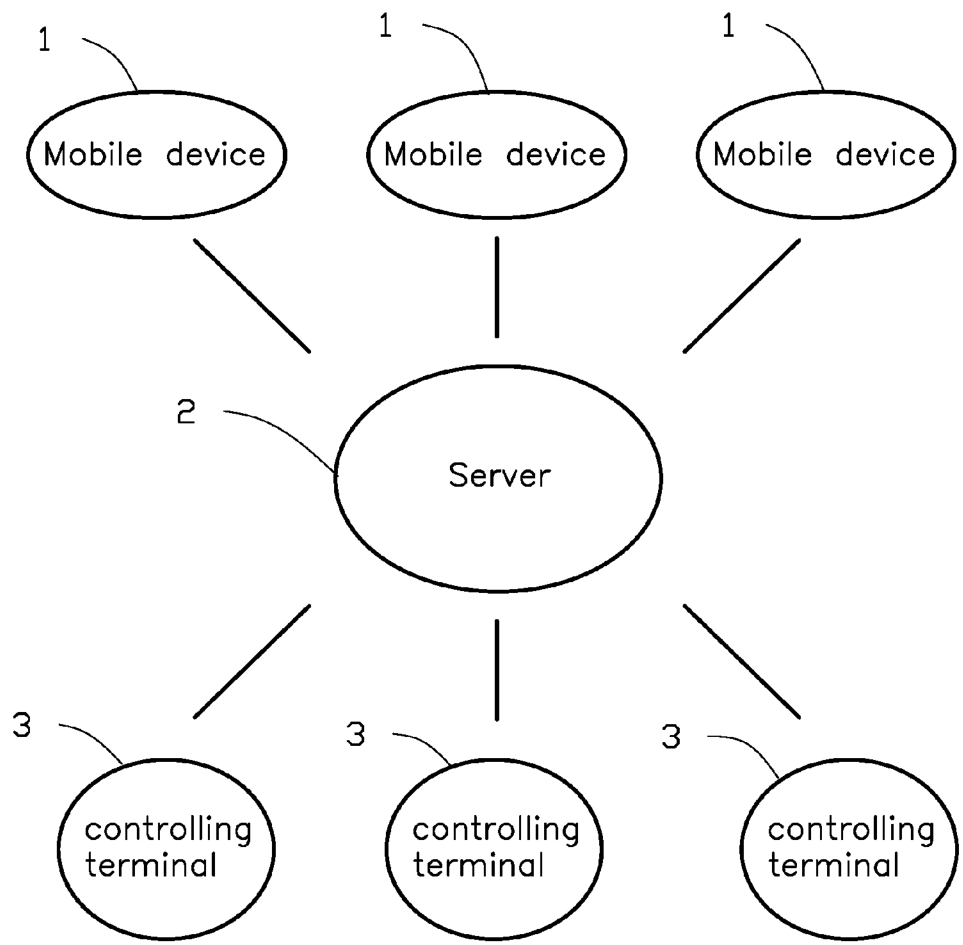
FIG. 3 is a diagram of an embodiment of an environment of a mobile device controlling system of the present disclosure.
Figure 4:
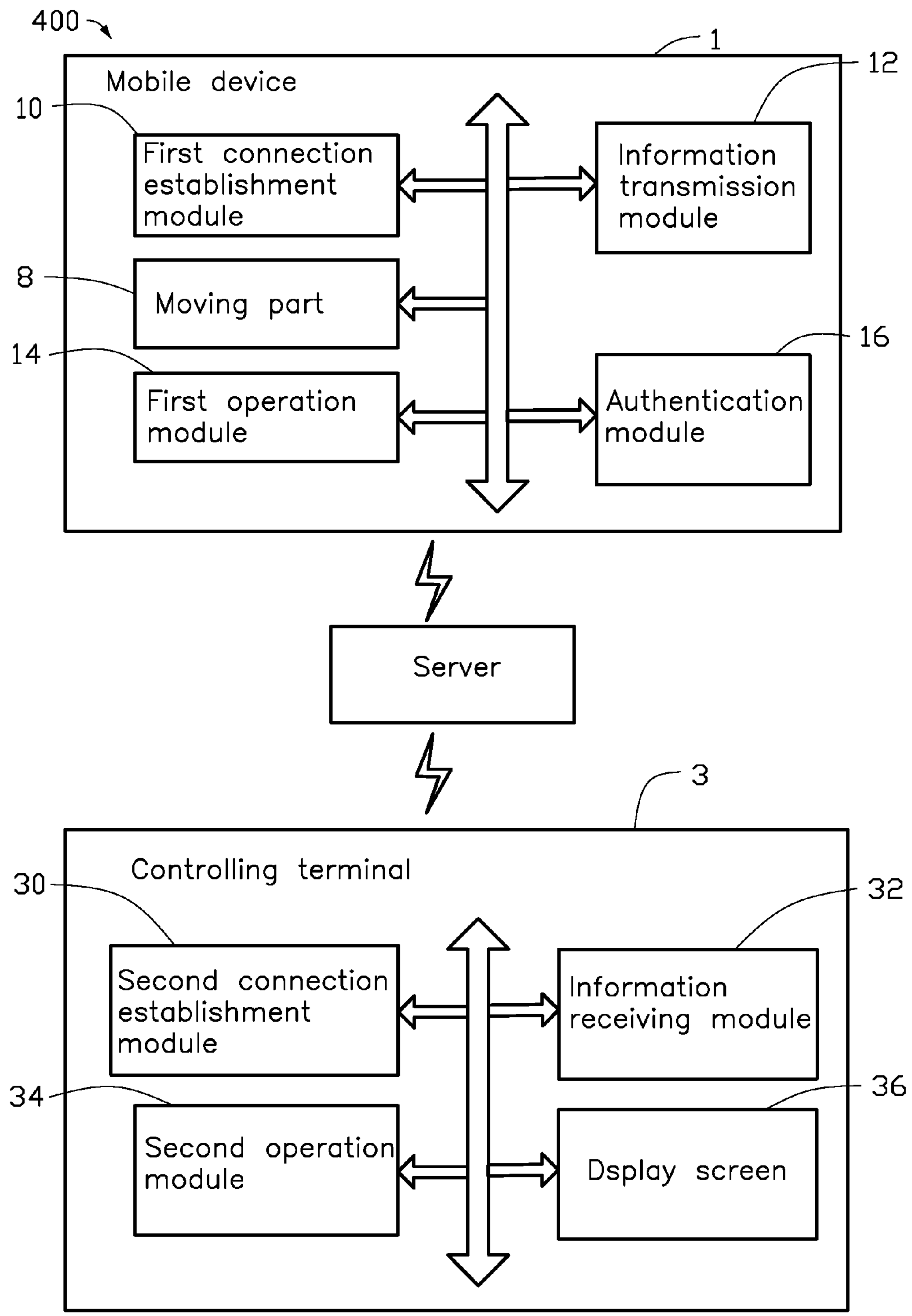
FIG. 4 is a block diagram of an embodiment of the mobile device controlling system of FIG. 3.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a mobile device controlling system.

Referring to FIG. 1-FIG. 4, an embodiment of a mobile device controlling system 400 is illustrated.

The mobile device controlling system 400 can comprise at least one mobile device 1, at least one controlling terminal 3, and a server 2. The server 2 can supply connection channels and control functions for multiple mobile devices and multiple controlling terminals.

The mobile device 1 comprises a moving part 8, a first connection establishment module 10, an information transmission module 12, and a first operation module 14. The mobile device can be moved via driving the moving part 8. The moving part 8 can comprise wheel or rotor wing. The first connection establishment module 10 is configured to transmit a first connection request, according to a first certification information, to the server 2 to establish a connection between the mobile device 1 and the server 2. The first certification information is a permission that the mobile device 1 is allowed to access the server 2. The mobile device 1 can obtain the permission through registering in the server 2. The information transmission module 12 is configured to transmit a mobile device identification information and a mobile device status information to the server 2. The first operation module 14 is configured to receive a feedback information outputted by the server 2 and control the mobile device 1 according to the feedback information.

The server 2 generates the information according to the mobile device identification information, the mobile device status information, and an operating information received by the server.

In one embodiment, the mobile device identification information can comprise a model information, a name information, and a type information. The mobile device status information comprises a location information, an operation information, and a network address.

In one embodiment, the mobile device 1 can be a robot, an unmanned car, or a drone. The server 2 can be a cloud server. When the mobile device 1 is started up, the mobile device 1 automatically transmits the first connection request to the server 2 to establish a connection between the mobile device 1 and the server 2.

The controlling terminal 3 can output the operating information to the server 2. The controlling terminal 3 can be a mobile phone, a tablet computer, or a smart watch.

The controlling terminal 3 comprises a second connection establishment module 30, an information receiving module 32, a second operation module 34, and a display screen 36. The second connection establishment module 30 is configured to transmit a second connection request, according to a second certification information, to the server 2 to establish a connection between the controlling terminal 3 and the server 2. The second certification information is a permission that the controlling terminal 3 is allowed to access the server 2. The controlling terminal 3 can obtain the permission through registering in the server 2. The information receiving module is configured to receive information as to multiple mobile devices through the server 2 and displays the information as to multiple mobile devices on the display screen 36, and then a user can select a target mobile device to access. The second operation module 34 is configured to output the operating information to the server 2 to control the target mobile device. The second connection establishment module 30 is further configured to transmit a third connection request to the server 2 to establish a connection between the controlling terminal 3 and the mobile device 1.

In one embodiment, the information as to multiple mobile devices received by the information receiving module 32 is minimal. When the user needs to obtain a particular information or further information about the mobile device 1, the mobile device 1 should be connected to the controlling terminal 3.

When the controlling terminal 3 transmits the third connection request to the server 2 to establish a connection between the controlling terminal 3 and mobile device 1, the mobile device 1 transmits a connection verification request to the controlling terminal 3 via the server 2. The information receiving module 32 is further configured to receive the connection verification request. The second connection establishment module 30 is further configured to transmit a connection verification information to the mobile device 1 via the server 2. When a verification of a mobile device is successful, the server 2 transmits the mobile device identification information and the mobile device status information to the controlling terminal 3. The controlling terminal 3 can display the mobile device identification information and the mobile device status information.

When the mobile device 1 is starting up, the mobile device 1 automatically transmits the first connection request to the server 2 to establish a connection between the mobile device 1 and the server 2. It is by these means that the server can obtain information as to the multiple mobile devices.

The mobile device 1 transmits the first connection request to the server 2 to establish a connection between the mobile device 1 and the server 2 via the first connection establishment module 10. The mobile device 1 transmits the mobile device identification information and the mobile device status information to the server 2 via the first certification information 12. The mobile device 1 receives the feedback information via the first operation module 14.

When the controlling terminal 3 is connected to the server 2, the controlling terminal 3 receives information as to multiple mobile devices. The controlling terminal 3 transmits the second connection request to the server 2 to establish a connection between the controlling terminal 3 and the server 2 via the second connection establishment module 30. The controlling terminal 3 receives the multiple mobile devices information via the second certification information 32. When the controlling terminal 3 is connected to the server 2, the controlling terminal 3 can output the operating information to the server 2 via the second operation module 34.

When the controlling terminal 3 transmits the third connection request to the server 2 to establish a connection between the controlling terminal 3 and the mobile device 1, the controlling terminal 3 need to transmit a controlling terminal identification information and a mobile device identification information to the server 2. Thereby, the server 2 can determine whether the mobile device 1 is allowed to have access. When access by the mobile device 1 is allowed, connection of the controlling terminal 3 to the mobile device 1 is possible.

The mobile device 1 further comprises an authentication module 16. When the controlling terminal 3 transmits the third connection request to the server 2 to establish a connection between the controlling terminal 3 and the mobile device 1, the authentication module 16 generates the connection verification request to the controlling terminal 3. The controlling terminal 3 receives the connection verification request and transmits the connection verification information to the mobile device 1. The authentication module 16 determines whether the controlling terminal 3 is an authorised controller according the connection verification information. When the controlling terminal 3 is authorised, the controlling terminal 3 is allowed to access the mobile device 1 via the server 2. When the controlling terminal 3 is not authorised, the mobile device 1 rejects the third connection request.

In one embodiment, the connection verification information can be in the form of a secret key, a password, or a digital certificate.

In one embodiment, the authentication module 16 is further configured to determine whether the mobile device 1 is in a locked or other state. The mobile device 1 assumes a locked state when a controlling terminal has succeeded in connecting to the mobile device 1, and the mobile device 1 will reject other connection requests until the mobile device 1 is again idle. Thereby, the mobile device 1 avoids being controlled by multiple controlling terminals.

In one embodiment, each of the mobile devices 1 releases only one set of connection verification information to the controlling terminal 3. Thereby, one mobile device can be controlled by only one controlling terminal, that is, the controlling terminal that is connected to the mobile device 1.

Figure 5:
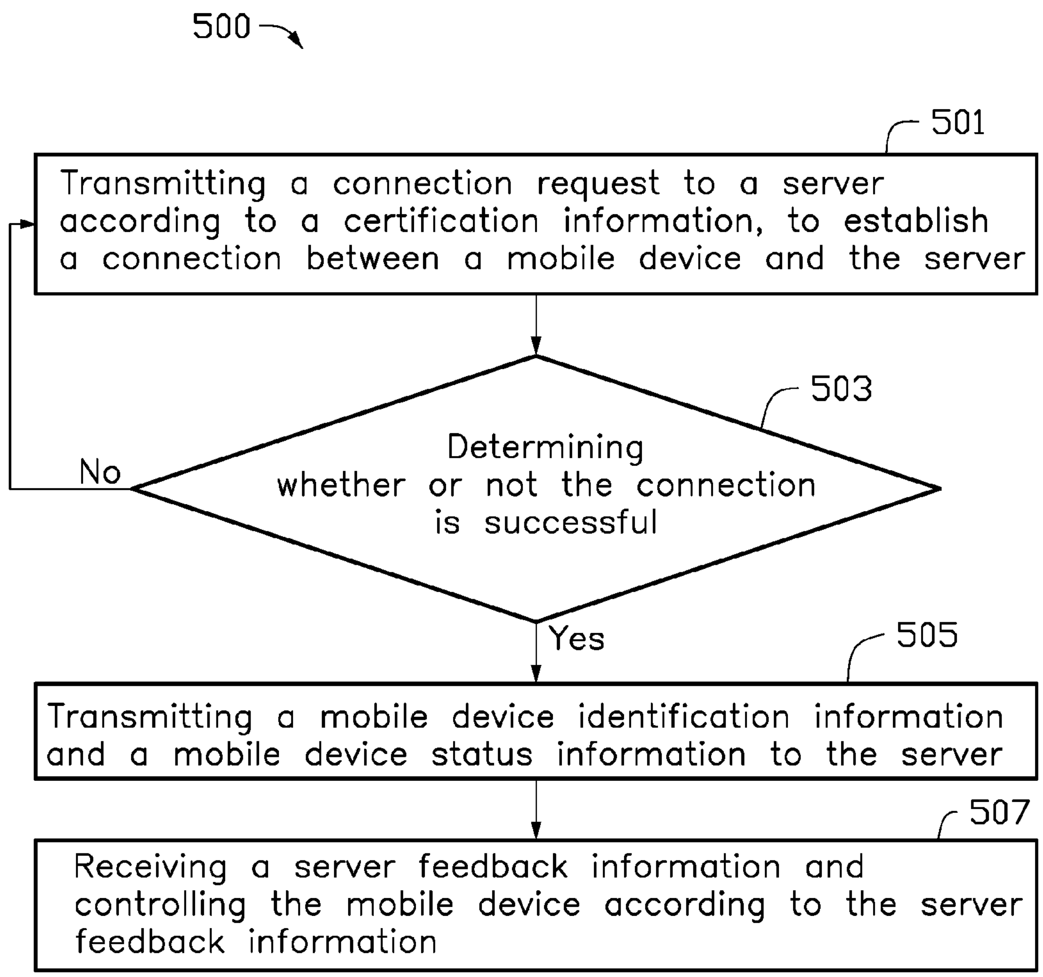
FIG. 5 is a flowchart of an embodiment of a mobile device controlling method.

FIG. 5 illustrates an embodiment of a method 500 for controlling a mobile device. The flowchart presents an example embodiment of the method. The example method is provided by way of example, as there are a variety of ways to carry out the method. The method described below can be carried out using the configurations illustrated in FIG. 4, for example, and various elements of these figures are referenced in explaining the example method. Each step shown in FIG. 5 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S501.

In step S501, the first connection establishment module 10 transmits the connection request to the server 2 according to the certification information, to establish the connection between the mobile device 1 and the server 2.

In step S503, the first connection establishment module 10 determines whether the connection is successful, if yes, performs step S505; if not, turn to step S501.

In step S505, the information transmission module transmits the mobile device identification information and the mobile device status information to the server 2.

In step S507, the first operation module 14 receives the server feedback information and controls the mobile device 1 according to the server feedback information.

In one embodiment, the step S507 further comprises: the first operation module 14 receiving the server feedback information; the authentication module 16 determining whether the server feedback information is authorised; the first operation module 14 controlling the mobile device 1 according to the server feedback information in response to the server feedback information being authorised; and the first operation module 14 rejecting controlling the mobile device 1 according to the server feedback information in response to the server feedback information being not authorised.

In one embodiment, the step S507 further comprises: the first operation module 14 receiving a server feedback information and determining whether the mobile device 1 is in a locking state; the authentication module 16 suspending determining the server feedback information in response to the mobile device 1 being in a locking state; and the authentication module 16 determining whether the server feedback information is authorised in response to the mobile device 1 being not in a locking state.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A mobile device comprising a moving part for moving, the mobile device further comprising:

a connection establisher transmitting a connection request to a server to establish a connection between the mobile device and the server;

an information transmitter transmitting a mobile device identification information and a mobile device status information to the server in response to the mobile device being connected to the server;

an authenticator; and an operator receiving a server feedback information;

wherein the connection establisher sends the connection request to the server according to a certification information, the server feedback information is generated by the mobile device identification information, the mobile device status information and an operating information received by the server; and the authenticator determines whether the server feedback information is authorised; and the operator controls the mobile device according to the server feedback information in response to the server feedback information being authorised.

2. The mobile device of claim 1, wherein the authenticator further determines whether the mobile device is in a locking state; and the authenticator suspends determining the server feedback information in response to the mobile device being in a locking state.

3. A controlling terminal, comprising:

a display screen;

a connection establisher transmitting a first connection request to a server to establish a connection between the controlling terminal and the server;

an information receiver receiving multiple mobile devices information through the server to display on the display screen; and an operator outputting an operating information to the server;

wherein the connection establisher sends the first connection request to the server according to a certification information, and the connection establisher further transmits a second connection request to the server to establish a connection between the controlling terminal and a target mobile device; and the information receiver further receives a connection verification request, and the connection establisher further transmits a connection verification information to the server, to transmit the target mobile device to verify.

4. The controlling terminal of claim 3, wherein when the controlling terminal is connected to the target mobile device, the server transmits a target mobile device identification information and a target mobile device status information to the controlling terminal.

5. A mobile device controlling system, comprising at least one mobile device, at least one controlling terminal, and a server;

each of the mobile device, comprising:

a first connection establisher transmitting a first connection request to the server to establish a connection between the mobile device and the server;

an information transmitter transmitting a mobile device identification information and a mobile device status information to the server in response to the mobile device being connected to the server; and a first operator receiving a feedback information and control the mobile device according to the feedback information;

each of the controlling terminal, comprising:

a second connection establisher transmitting a second connection request to the server to establish a connection between the controlling terminal and the server;

an information receiver receiving multiple mobile devices information through the server; and a second operator outputting an operating information to the server;

wherein the first connection establisher sends the first connection request to the server according to a first certification information, and the second connection establisher sends the second connection request to the server according to a second certification information; the second connection establisher further transmits a third connection request to the server to establish a connection between the controlling terminal and the mobile device; and the server generates the feedback information according to the mobile device identification information, the mobile device status information and the operating information.

6. The mobile device controlling system of claim 5, wherein the mobile device further comprises an authenticator; and the authenticator outputs a connection verification request to the controlling terminal in response to receiving the third connection request, the authenticator further determines whether the controlling terminal is authorised; and the controlling terminal is allowed to connect to the mobile device via the server in response to the controlling terminal being authorised.

7. The mobile device controlling system of claim 6, wherein the authenticator further determines whether the mobile device is in a locking state; and the authenticator suspends determining the controlling terminal in response to the mobile device being in a locking state.

8. The mobile device controlling system of claim 6, wherein the information receiver further receives the connection verification request, the second connection establisher further transmits a connection verification information to the server, to transmit the mobile device to verify.

9. The mobile device controlling system of claim 5, wherein when the controlling terminal is connected to the mobile device, the server transmits the mobile device identification information and the mobile device status information to the controlling terminal.

10. A mobile device controlling method, comprising:

transmitting a connection request to a server according to a certification information, to establish a connection between the mobile device and the server;

determining whether the connection is successful;

transmitting a mobile device identification information and a mobile device status information to the server in response to the mobile device being connected to the server;

receiving a server feedback information and determining whether the server feedback information is authorised; and controlling the mobile device according to the server feedback information in response to the server feedback information being authorised, and the server feedback information generated by the mobile device identification information, the mobile device status information and an operating information received by the server.

11. The mobile device controlling method of claim 10, further comprising:

rejecting controlling the mobile device according to the server feedback information in response to the server feedback information being not authorised.

12. The mobile device controlling method of claim 10, wherein the step of receiving a server feedback information and determining whether the server feedback information is authorised comprising:

receiving a server feedback information and determining whether the mobile device is in a locking state;

suspending determining the server feedback information in response to the mobile device being in a locking state; and determining whether the server feedback information is authorised in response to the mobile device being not in a locking state.

* * * * *